Figure 1:
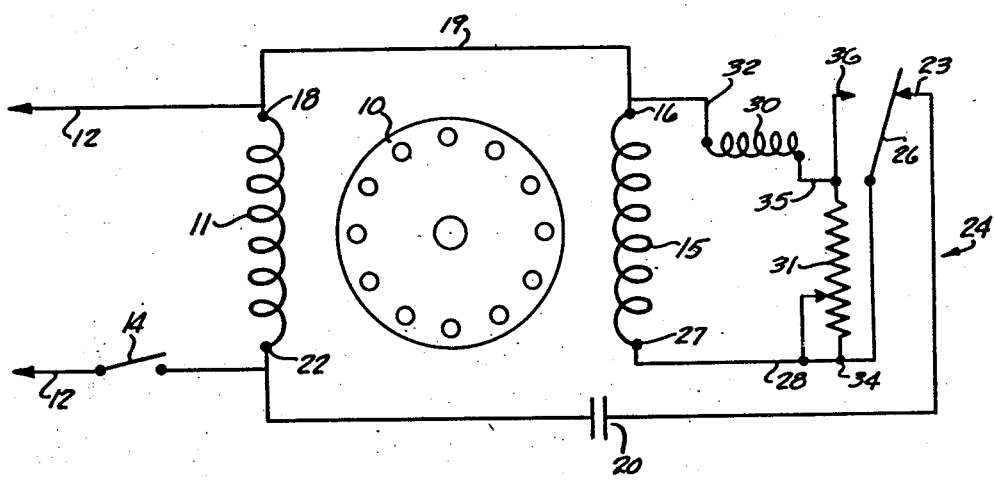

March 28, 1950  O. LINDFORS  2,502,099

SINGLE PHASE MOTOR STARTING

Filed Aug. 30, 1945

INVENTOR
ONNI LINDFORS
ATTORNEY

Patented Mar. 28, 1950

2,502,099

UNITED STATES PATENT OFFICE 2,502,099

SINGLE-PHASE MOTOR STARTING

Onni Lindfors, Beloit, Wis., assignor to Fairbanks, Morse & Co., Chicago, Ill., a corporation of Illinois Application August 30, 1945, Serial No. 613,556

7 Claims. (Cl. 318—221)

This invention relates generally to improvements in alternating current machines of single phase type, and more particularly to improved starting and control provisions for single phase induction motors.

It is well known that a single phase induction motor having only a main field winding, is inherently incapable of self-starting even under no load. Consequently, it is a common practice to provide such motors with an auxiliary or secondary field-producing means which is sufficiently out of phase with the main field to afford effective starting of the motor. The present invention concerns motors of this character which include an auxiliary or starting winding and a current phase shifting device in the circuit of the starting winding, with presently improved provisions for disconnecting the starting circuit as the motor attains normal running operation.

More particularly stated, a principal object of the present invention is to provide in a single phase induction motor, an auxiliary or starting winding including improved and effective control means, which is operative to afford a relatively high starting torque, and wherein the control means is operable to condition the motor for normal operation as the motor approaches normal running speed, and is effective further upon limited overloading of the motor, to increase the motor torque until the overload is reduced, and thence to recondition the motor for normal running.

In accordance with the foregoing, the present improvements afford in a single phase induction motor having a starting winding and a capacitor in series therewith, a starting circuit control relay adapted for operative response to the voltage across the starting winding and adjustable through a resistance element, for determining the voltage operation thereof to disconnect the starting circuit from the main winding circuit.

Another object of the invention is to provide a voltage responsive relay in the motor starting circuit as aforesaid, wherein the regulating resistance element is shunted upon disconnection of the motor starting circuit, to condition the relay for response to a predetermined low voltage across the starting winding, occurring in the event the motor is temporarily overloaded to a limited extent when the starting circuit is disconnected, whereby to re-connect the starting circuit for increasing the motor torque to care for the overload until it is reduced and the motor approaches or attains normal running speed, when the relay again operates to disconnect the starting circuit.

Figure 2:
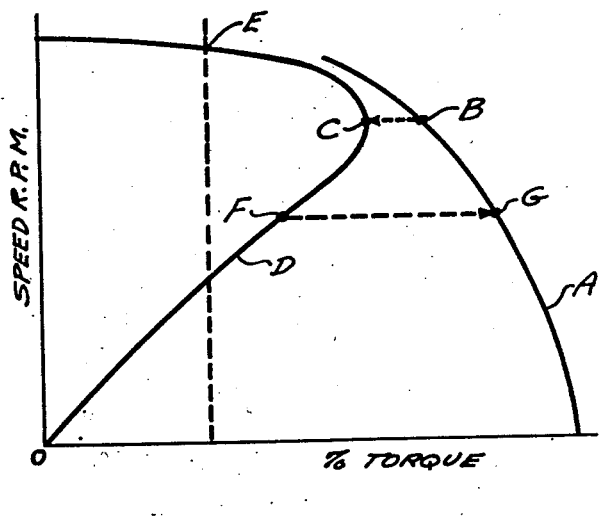

Other objects and advantages of the present invention will appear readily from the following description of a presently preferred embodiment thereof, as illustrated in the accompanying drawing, wherein:

Fig. 1 is a diagrammatic view of a single phase induction motor having the present improvements applied thereto, and Fig. 2 illustrates graphically, the speed-torque characteristics of the presently improved motor.

Referring first to Fig. 1, the single phase induction motor as shown, includes a rotor 10 of the so-called "squirrel cage" type, a main field winding 11 in shunt with single phase current supply mains 12 through a control switch 14, and an auxiliary or starting field winding 15. The latter has one end 16 thereof permanently electrically connected with one end 18 of the main winding 11, as by a conductor 19. A current phase-shifting device such as a condenser 20 of suitable capacity, is connected to the end 22 of motor winding 11, and to a contact 23 of a control device or relay indicated generally by the numeral 24. The movable contactor or switch arm 26 of the relay, being normally in engagement with the contact 23 when the motor is inoperative or when certain operating conditions of the motor obtain as will appear hereinafter, is in circuit with the end 27 of starting winding 15 through a lead 28. Permanently in shunt with the starting winding 15 are the serially-connected relay operating coil 30 and resistance element 31, the former having one end connected to the end 16 of winding 15 by a lead 32, and the free end of the resistance 31 in turn, being connected to lead 28 as at 34. The series connection 35 of the coil and resistance, is connected as shown, to a second fixed contact 36 of the relay.

From the foregoing description of the circuit arrangement, it will now appear that when the relay arm 26 engages contact 23, the starting winding 15 and condenser 20 are serially-connected and in shunt with the main motor winding 11, while the relay coil 30 and resistance 31 in series, are shunted across the starting winding 15. Further, when the relay arm 26 engages the contact 36, the series connection of the condenser 20 and starting winding 15 is broken at the then open relay contact 23, so that the starting circuit is thereby disconnected with respect to the main winding 11. However, under this condition the resistance is short-circuited as appears, while the relay coil 30 remains in shunt with the starting winding 15.

In the single phase motor arrangement above described, during starting and as the motor approaches running speed, the voltage appearing across the starting winding 15 increases to values considerably in excess of the source voltage of the supply mains 12. Assuming for the purpose of a better understanding of the function and advantages of the presently improved starting control provisions, that the single phase motor of Fig. 1 is a fractional horse power motor with a speed rating of approximately 1750 R. P. M. on a 60 cycle, 115 volt line, the starting winding voltage may exceed 200 volts at no load, full speed operation of the motor with the starting circuit connected. Since it is neither desirable nor necessary to delay open-circuiting of the starting circuit until the motor has reached its normal rated speed, the relay 24 may be set, through its operating winding 30 and by proper selection of the resistance 31 such that its resistance value is about 2000 ohms according to the present example, so that the relay will respond to approximately 160 volts obtaining across the starting winding 15 as the motor speed approaches about 1600 R. P. M. (assuming the line voltage to be at about 115 volts). When this occurs, the contactor arm 26 is actuated preferably quickly as by a snap-movement, from its engagement with contact 23 to engagement with contact 36. As a result, the starting circuit becomes disconnected through the open-circuiting of the series-connection between the condenser 20 and starting winding 15, so that the motor then operates on the running circuit only, including the main field winding 11.

When the relay functions to disconnect the starting circuit, a voltage appears across the starting winding 15 as a result of transformer action between the starting and running windings. However, the value of such voltage is relatively low, being approximately 60 or 65 volts following relay disconnection of the starting circuit, but normally increases to a value approaching line voltage when the motor attains its rated running speed. This voltage is here utilized to hold the relay open with respect to the starting circuit, under normal motor operation. As appears from Fig. 1, when the starting circuit is opened, the resistance 31 is short-circuited through engagement of the relay arm 26 with contact 36, thus leaving the relay coil 30 in direct shunt to the starting winding 15. The design of coil 30 is such in the present example, that with the resistance shunted, it will function to hold relay arm 26 against contact 36 in response to voltages of the starting winding obtaining during motor operation above a predetermined speed, as for present example, above a motor speed of about 1200 R. P. M., but will release the relay arm for reconnection of the starting circuit when the starting winding voltage drops to or below approximately 40 volts, corresponding to a motor speed at or below 1200 R. P. M. The foregoing operation of the relay is utilized to great advantage as will now be described.

Referring to Fig. 2, which shows graphically the torque characteristics of the motor in the present example, during starting with the starting winding 15 and condenser 20 in circuit, the motor torque is advantageously high, following the torque-speed curve A. Now as the voltage of the starting winding rises to about 160 volts, the relay 24 responds to open-circuit the starting circuit, this occurring at about the point B on torque curve A. The torque characteristic of the motor is then immediately transferred to the point C on the normal single phase running curve D, from which and under normal operating conditions, the motor will continue to accelerate to or above the point E on curve D, the latter point indicating the normal full load torque of the motor at approximately its rated speed of 1750 R. P. M. However, should the motor be temporarily overloaded when the relay operates to disconnect the starting circuit, the motor speed will drop and when the point F on curve D is reached, the voltage of the starting winding 15 will have dropped to about 40 volts. Consequently, the relay 24 then will reconnect the starting circuit so as to increase the motor torque, as to the point G on torque curve A. The motor, therefore, will be conditioned for acceleration with increased torque, whereby to overcome the overloading, and will be restored to normal running condition upon the motor speed rising to the value corresponding to point B on the curve A, when the motor may attain running speed in the absence of further overload.

One important advantage is now apparent in respect to the arrangement providing the relay coil 30 in shunt with the starting winding during running operation of the motor, as such affords a sensing circuit for causing re-insertion of the motor starting circuit upon motor overloading to an extent resulting in speed reduction to or below the point where the transformer-induced voltage of the starting winding is at or below the drop-out voltage of the relay. Re-connection of the starting circuit of course, immediately increases the motor torque to care for the overload as well as to assist the motor to return to normal running conditions when the overload is reduced or removed.

It is now apparent also, that the starting characteristics of the motor may be readily determined or changed by utilizing resistance units 31 of different ohmic values, or of variable resistance character as indicated in the drawing. Further, by employing different resistances or a variable resistance, the relay may be adapted for use with any single phase motor of the type shown, within a given range of motor speed and power output and operating on a suitable single phase alternating current source, such as that of either 115 or 230 volts.

Having now shown and described a presently preferred embodiment of the invention, it will be understood that modifications and different arrangements of the parts thereof may be made within the scope of the invention.

What I claim is:

1. In combination, a single phase motor having a plurality of windings, a phase advancing means, an energizing circuit for one of said windings, a circuit for connecting said phase advancing means and another of said windings in parallel with the first mentioned winding, a switch in said last circuit, including an operating coil and a regulating resistance series-connected in a circuit in parallel with the second mentioned winding, said operating coil as regulated by said resistance, affording operation of said switch in response to a predetermined voltage of the second mentioned winding, for rendering ineffective said phase advancing means and second mentioned winding, and said switch including contact means effective upon the foregoing said operation of the switch, to short-circuit said resistance.

2. In combination, a single phase motor having a plurality of windings, an energizing circuit for one of said windings, a condenser, a starting circuit for connecting said condenser and another of said windings in parallel with the first mentioned winding, and control switch means responsive to voltage variations of the second mentioned winding to control said starting circuit for rendering effective or ineffective the latter winding and said condenser, said switch means including an operating coil and a regulating resistance element in circuit therewith, connected to said second mentioned winding, said switch means as regulated by said resistance, being operable in response to a predetermined high voltage across said second mentioned winding, to open said starting circuit, and contact means operative to shunt said resistance element upon operation of the control switch means to open the starting circuit and render ineffective the second mentioned winding and condenser, shunting of said resistance altering the operating characteristic of the control switch means for response thereof to a predetermined low voltage across the second mentioned winding, for causing closure of said starting circuit.

3. In an electrical system, the combination of a source of current supply, and a single phase motor including a main winding, connected to said source, an auxiliary winding, a phase shifting device and means including a magnetic relay, for connecting said auxiliary winding and phase shifting device in parallel circuit with said main winding, said relay including an energizing winding and a regulating resistance in parallel circuit with said auxiliary winding, wherein said relay energizing winding as regulated by said resistance, is responsive to a predetermined voltage of said auxiliary winding, to cause relay operation to disconnect said auxiliary winding and phase shifting device, and contact means in the relay for shunting said resistance upon relay operation to disconnect the auxiliary winding and phase shifting device.

4. In an electrical system, the combination of a source of current supply, a single phase motor supplied from said source and including main and auxiliary windings, and control means in circuit with said windings, said control means including a condenser and an electromagnetic means normally connecting the condenser in series circuit with said auxiliary winding during motor starting, and said electromagnetic means including an operating coil and a resistance in series, connected across said auxiliary winding for energization of the operating coil as regulated by the resistance, and contact means for disconnectin the series circuit of the condenser and auxiliary winding and shunting said resistance in response to energization of said operating coil as the motor approaches normal running speed, shunting of said resistance rendering said operating coil energizable by said auxiliary winding upon motor operation at a predetermined speed below said normal running speed, for actuating said contact means to connect the series circuit of the condenser and auxiliary winding.

5. An induction motor having in combination, a rotor, a stator providing a main winding and an auxiliary winding, a capacitance, said capacitance and auxiliary winding being connected in series across said main winding at motor starting, and electromagnetic means in parallel circuit with said auxiliary winding and responsive to voltage variations therein, said means including a variable resistance effective during motor starting for conditioning said means for response to a predetermined high voltage of the auxiliary winding obtaining as the motor approaches running operation, to render the auxiliary winding and capacitance ineffective in the motor circuit, and said means further including contact-means effective upon operation of the electromagnetic means to render the auxiliary winding and capacitance ineffective in the motor circuit, for rendering said variable resistance ineffective whereby to condition the electromagnetic means for response to a predetermined low voltage of the auxiliary winding, to render the auxiliary winding and capacitance effective in the motor circuit.

6. An induction motor having in combination, a rotor, a stator providing a main winding and an auxiliary winding, a capacitance, an electromagnetic switch including switch contacts and an operating coil in circuit with said auxiliary winding, a circuit including said electromagnetic switch contacts in closed positions, connecting said auxiliary winding and capacitance in series across said main winding at motor starting, said electromagnetic switch being operable responsively to voltage variations of said auxiliary winding, a variable resistance forming a part of said electromagnetic switch and arranged in circuit with said operating coil thereof, effective at motor starting to determine response of the electromagnetic switch to a predetermined high voltage of the auxiliary winding, for opening said contacts to disconnect said circuit and render ineffective the capacitance and auxiliary winding relative to said main winding, and a control circuit for said variable resistance including a contact engaged by one of the first said switch contacts upon opening of the latter, for rendering said variable resistance ineffective whereby to alter the voltage-responsive characteristic of the eletromagnetic switch such as to condition the switch for operation in response to a predetermined low voltage of the auxiliary winding, to re-connect said circuit and thereby re-connect said auxiliary winding and capacitance in series across said main winding.

7. A single phase induction motor having in combination, a rotor, a stator including a main and an auxiliary winding, a condenser, a circuit including an electromagnetic switch, effective in circuit closing position of the switch for connecting said condenser and auxiliary winding in series across said main winding for motor starting, said electromagnetic switch including an energizing coil and a regulating resistance in series and permanently connected in parallel with said auxiliary winding, said energizing coil as regulated by said resistance, responding to a predetermined relatively high voltage of said auxiliary winding occurring therein during motor starting, to cause operation of said switch to a circuit-open position for disconnecting said condenser and auxiliary winding, whereby to condition the motor for normal running on said main winding, said main winding thereafter effecting by transformer action with the auxiliary winding, a reduced voltage in the latter, and said switch further including contact means connected to said resistance, effective in the circuit-open position of the switch to establish a shunt about said resistance, whereby to render the switch energizing coil responsive to a predetermined low voltage of the auxiliary winding, for permitting operation of the switch to its circuit-closing position, to reconnect said condenser and auxiliary winding in series across said main winding.

ONNI LINDFORS.

REFERENCES CITED

The following references are of record in the file of this patent:

UNITED STATES PATENTS

| Number | Name | Date |
|---|---|---|
| 1,588,893 | Krantz | June 15, 1926 |
| 1,690,187 | Zumbro et al. | Nov. 6, 1928 |
| 1,828,724 | Yost | Oct. 20, 1931 |
| 1,974,989 | Hamm | Sept. 25, 1934 |
| 2,008,845 | Valkenburg | July 23, 1935 |
| 2,104,399 | Kuhn | Jan. 4, 1938 |
| 2,407,117 | Warner | Sept. 3, 1946 |

FOREIGN PATENTS

| Number | Country | Date |
|---|---|---|
| 45,590 | France | Aug. 5, 1935 |
| | (Addition to No. 788,336) | |
| 630,915 | Germany | June 9, 1936 |